United States Patent [19]

Pentland et al.

[11] Patent Number: 5,148,497
[45] Date of Patent: Sep. 15, 1992

[54] FRACTAL-BASED IMAGE COMPRESSION AND INTERPOLATION

[75] Inventors: Alex P. Pentland, Cambridge; Eero P. Simoncelli, Somerville; Thomas P. Stephenson, Boston, all of Mass.

[73] Assignee: Massachusetts Institute of Technology, Cambridge, Mass.

[21] Appl. No.: 773,779

[22] Filed: Oct. 10, 1991

Related U.S. Application Data

[63] Continuation of Ser. No. 479,759, Feb. 14, 1990, abandoned.

[51] Int. Cl.$^5$ .............................................. G06K 9/36
[52] U.S. Cl. ...................... 382/54; 382/47; 395/128
[58] Field of Search ............... 382/41, 47, 54, 56; 364/723, 724.1; 395/128

[56] References Cited

U.S. PATENT DOCUMENTS

| | | | |
|---|---|---|---|
| 4,683,496 | 7/1987 | Tom | 358/166 |
| 4,692,806 | 9/1987 | Anderson et al. | 358/209 |
| 4,698,843 | 10/1987 | Burt et al. | 382/54 |
| 4,703,514 | 10/1987 | van der Wal | 382/41 |
| 4,718,104 | 1/1988 | Anderson | 382/41 |
| 4,742,553 | 5/1988 | Irwin | 382/47 |
| 4,751,742 | 6/1988 | Meeker | 382/41 |
| 4,817,182 | 3/1989 | Adelson et al. | 382/56 |
| 4,837,843 | 6/1989 | Owechko | 382/31 |
| 5,025,394 | 6/1991 | Parke | 364/518 |

FOREIGN PATENT DOCUMENTS 0293041 11/1988 European Pat. Off. .

OTHER PUBLICATIONS

E. H. Adelson et al., "Pyramid methods in image processing", RCA Engineer, vol. 29, No. 6, (1984), pp. 33–41.

E. Walach et al., "A Fractal Base Approach To Image Compression", 1986 Proceedings of the ICASSP, Tokyo, vol. 1, pp. 529–532.

B. Hason et al., "Mutual Information of Images: A New Approach to Pyramidal Image Analysis", SPIE, vol. 1001, (1988), pp. 555–562.

Primary Examiner—Leo H. Boudreau
Assistant Examiner—Andrew W. Johns
Attorney, Agent, or Firm—Fish & Richardson

[57] ABSTRACT

An image interpolator for converting an original image into an enhanced image, the interpolator including rule logic for embodying a rule specifying how pixel patterns associated with first subband image data transform into corresponding pixel patterns associated with second subband image data, the first and second subband image data being derived from a reference image; and conversion logic for generating the enhanced image from the original image based upon the rule.

36 Claims, 7 Drawing Sheets

FRACTAL-BASED IMAGE COMPRESSION AND INTERPOLATION

This is a continuation of application Ser. No. 07/479,759, filed Feb. 14, 1990, now abandoned.

BACKGROUND OF THE INVENTION

The invention relates to digital image compression and interpolation.

In digital image processing, the image is encoded and processed as an array of pixel intensities. To improve the image so that it is more suitable for a particular application various enhancement techniques are available to process the digitally encoded image. The enhancement techniques fall into two general categories, namely, frequency-domain methods and spatial-domain methods. The first category typically involves modifying the Fourier transform of the image; whereas, the latter category typically involves manipulation of pixels in the image.

The basis of the frequency domain methods is the convolution theorem. That is, the original image is convolved with a position-invariant operator to form another image. It can be shown that this operation is equivalent to multiplying the Fourier transform of the image function by the Fourier transform of the operator, also sometimes referred to as the transfer function. The transfer function is generally selected to accentuate some important features of the image, for example, the high frequency components which are associated with edge detail.

In contrast, spatial-domain methods generally define an aggregate of pixels, also referred to as a subimage, centered at some location (x,y) of the image. An operator is then applied to the subimage as the center of the subimage is moved from pixel to pixel of the larger image. For example, the operator could compute a weighted average of the pixels surrounding the location (x,y), in which case, the operator would be performing a smoothing operation. Such smoothing operations are typically used to diminish the effects of noise in the original image.

SUMMARY OF THE INVENTION

In general, in one aspect, the invention features an image interpolator for converting an original image into an enhanced image. The interpolator includes rule logic for embodying a rule specifying how pixel patterns associated with first subband image data transform into corresponding pixel patterns associated with second subband image data, the first and second subband image data being derived from a reference image; and conversion logic for generating the enhanced image from the original image based upon the rule.

Preferred embodiments include the following features. The reference image is derived from the original image. The first and second subband image data are derived from the original image, and the second subband image data represents higher spatial frequencies than the first subband image data. The conversion logic includes means for generating high resolution subband image data from the second subband image data in accordance with the rule; and means for combining the original image with the high resolution image data to generate the enhanced image. The high resolution subband image data has a spatial frequency resolution that is higher than the spatial frequency resolution of the original image. The rule logic further includes a filter for generating the first and second subband image data from the original image; and means for deriving the rule from the first and second subband image data. The deriving means includes table generating logic for generating a table relating each of a plurality of N×N pixel patterns from the first subband image to a corresponding M×M pixel pattern of the second subband image. The filter employs a Gaussian-like filter to generate the first and second subband image data.

Also in preferred embodiments, the conversion logic includes means for generating high resolution subband image data from the second subband image data in accordance with the rule, the high resolution subband image data having a spatial frequency resolution that is higher than the spatial frequency resolution of the original image; and means for combining the original image with the high resolution image data to generate the enhanced image. The generating means includes selection logic for selecting an N×N pixel pattern of the second subband image; search logic for finding the N×N pixel pattern of the table which best matches the selected N×N pixel pattern; and assignment logic for assigning to a corresponding location of the high resolution subband image the M×M pixel pattern from the table that is associated with the identified N×N pixel pattern. The first and second subband image data correspond to neighboring subbands of the reference image.

In other preferred embodiments, the deriving means includes neural network generating logic for generating an associative neural network relating each of a plurality of N×N pixel patterns from the first subband image to a corresponding M×M pixel pattern of the second subband image. The filter employs a quadrature mirror filter to generate the first and second subband image data.

In yet other preferred embodiments, the deriving means includes coefficient generating logic for generating coefficients for a set of equations relating each of a plurality of N×N pixel patterns from the first subband image to a corresponding M×M pixel pattern of the second subband image.

In general, in yet another aspect, the invention features a method for converting an original image into an enhanced image. The method includes the steps of determining a rule according to which pixel patterns associated with first subband image data are transformed into corresponding pixel patterns associated with second subband image data, the first and second subband image data being derived from a reference image; and generating the enhanced image from the original image based upon said rule.

An advantage of the invention is that it exploits the fractal nature of images to predict the information that lies in higher frequency subbands of the image or in noisecorrupted subbands. That is, the invention exploits the self-similarity that exists across scale in images (e.g. across subbands of the image). Details are added to the original image based upon the relationship between patterns that are observed across subbands of the original image. The invention can significantly increase the resolution of the image based solely on the information contained in the original transmitted image and without having to rely on additional information that is sent with the image. Or the invention can predict image information that has been corrupted in certain subbands due to noise or other distortions.

The invention also provides an effective way of achieving data compression. Rather than transmitting the original image, a scaled-down version of the image from a higher level of the low-pass image pyramid can be sent. Then, the interpolation techniques described herein can be used to generate the higher resolution image from the transmitted image.

Other advantages and features will become apparent from the following description of the preferred embodiment and from the claims.

DESCRIPTION OF THE PREFERRED EMBODIMENT

STRUCTURE AND OPERATION

Figures 1, 3:
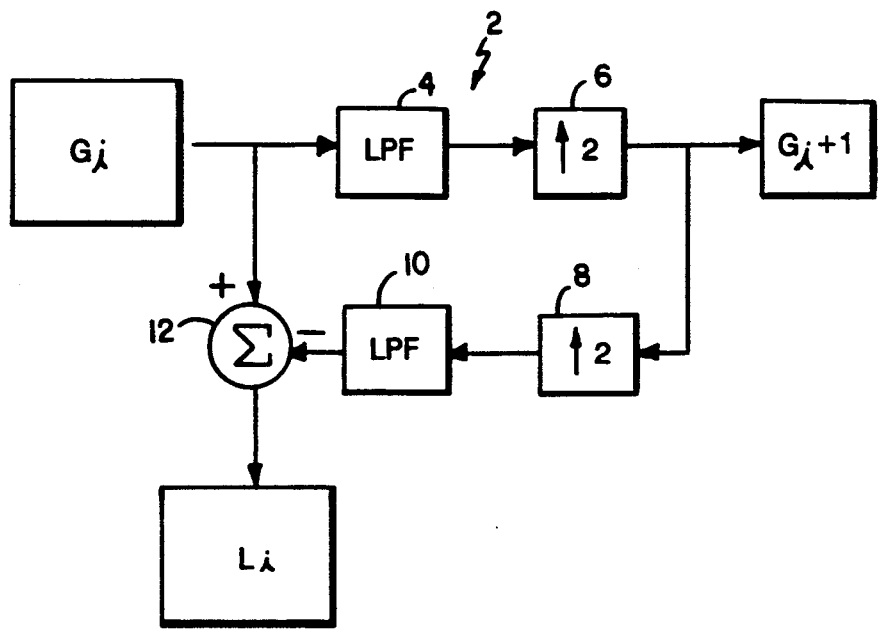
FIG. 1 is a block diagram of a circuit for generating a Gaussian image pyramid and a corresponding Laplacian image pyramid from an original image.
FIG. 3 is a data structure derived from two neighboring levels of a Laplacian image pyramid.

The process for generating a higher resolution image from an existing image involves using two different image representations, namely, a low-pass image representation and a band-pass image representation. In the described embodiment, the low-pass image representation is a Gaussian image pyramid and the band-pass image representation is a Laplacian image pyramid that is derived from the Gaussian image pyramid. FIG. 1 depicts a basic generating circuit 2 for producing both of these representations.

For the following description, the images of the Gaussian image pyramid are designated $G_i$ and the images of the Laplacian image pyramid are designated $L_i$, where i is a positive integer index identifying the level of the pyramid. In the Gaussian image pyramid, the resolution of each successively higher image level decreases by an octave from the previous level and in the Laplacian image pyramid each image level represents the spatial frequency information that is removed from the corresponding image in the Gaussian image pyramid to produce the next higher image level. That is, the Laplacian image pyramid is also generally referred to as an invertible multi-scale subband image representation. It is invertible because the original image from which it was derived can be reconstructed from the subband images.

In generating circuit 2, a Gaussian image $G_i$, which may be the original image, passes through a low-pass filter (LPF) 4 that utilizes a gaussian-like weighting function to produce a "blurred" representation of $G_i$. Each pixel of the "blurred" representation of $G_i$ is a weighted average of a group of pixels surrounding the corresponding pixel of $G_i$. A sub-sampler 6 subsamples the "blurred" representation in both directions of the image to produce a Gaussian image $G_{i+1}$. Because of the averaging process, each pixel in the "blurred" representation of $G_i$ contains image information that is redundant with the image information carried by its neighbors. By removing every other pixel in both directions, subsampler 6 eliminates some of the redundant information from the "blurred" representation.

An upsampler 8 expands the Gaussian image $G_{i+1}$ by a factor of two in both directions to produce an expanded image having the same size as the original Gaussian image $G_i$ from which it was derived. Basically, the "upsampling" inserts zero value pixels between the pixels of the Gaussian image $G_{i+1}$ in both image directions thereby increasing the total number of pixels by a factor of four. The expanded image is then passed through a low-pass filter (LPF) 10 which generates values for the inserted pixels of the expanded image to produce a low-pass version of $G_i$, i.e., a version which has half the resolution. LPF 10 utilizes the same gaussian-like weighting function as is used by LPF 4 to interpolate values for the inserted pixels.

Finally, in generating circuit 2, an adder 12 subtracts the low-pass version of $G_i$ from the original $G_i$ to produce a Laplacian image $L_i$, which carries only the high frequency information of $G_i$. The subtraction is performed on a pixel-by-pixel basis, subtracting the value of a pixel of the low-pass version of $G_i$ from the value of a corresponding pixel of original image $G_i$.

By recursively continuing this process, successive images levels of both pyramids can be produced. Thus, for example, Gaussian image $G_{i+2}$ and laplacian image $L_{i+1}$ are readily generated by simply passing gaussian image $G_{i+1}$ through another generating circuit 2.

Of course, generating circuit 2 may be implemented in any of a number of different ways. For example, it may be implemented in software using a digital signal processor or it may be implemented as a hardwired circuit.

Figure 2A:
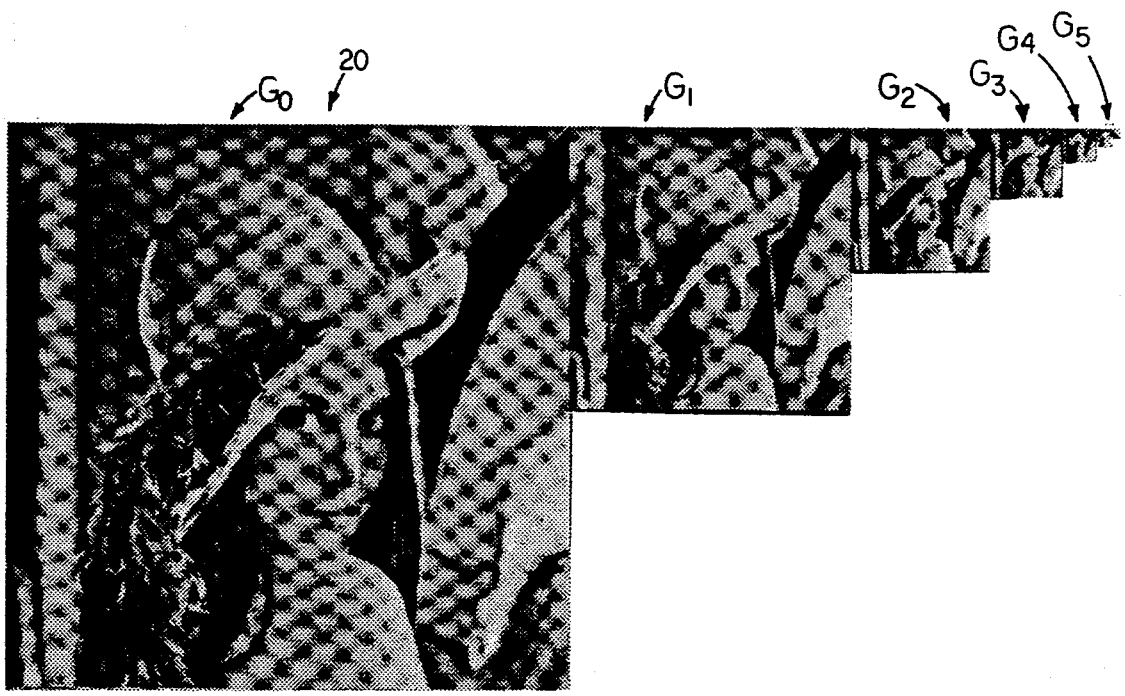
FIGS. 2a and 2b are examples of a Gaussian image pyramid and a Laplacian image pyramid, respectively.
Figure 2B:
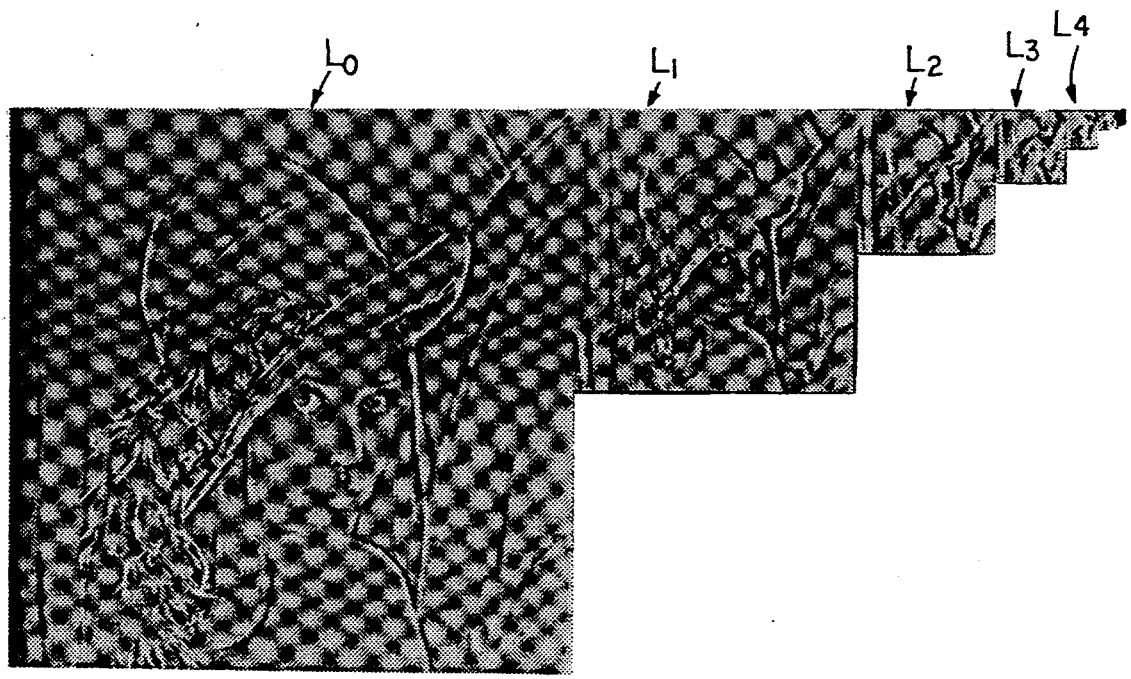

The resulting Gaussian image pyramid and Laplacian image pyramid resulting from recursively applying the abovedescribed process to an original image 20 are shown in FIGS. 2a and 2b, respectively.

Referring to FIG. 3, a data structure 30 is generated from the information contained in two neighboring images of the Laplacian image pyramid. Data structure 30 includes two linked tables, namely, a pattern table 32 and an interpolation table 34. Pattern table 32 contains a list of N×N pixel patterns, $S_{x,y}$, found in Laplacian image $L_{i+1}$, where x and y are the coordinates of the pixel with which the pattern is associated. Interpolation table 34 contains for each pixel pattern entry in pattern table 32 a corresponding M×M pixel pattern, $T_{2x,2y}$, from Laplacian image $L_i$. In other words, data structure 30 represents a rule describing how patterns from Laplacian image $L_{i+1}$ are transformed into corresponding patterns Laplacian image $L_i$. In the described embodiment, N=3 and M=2.

Figure 4:
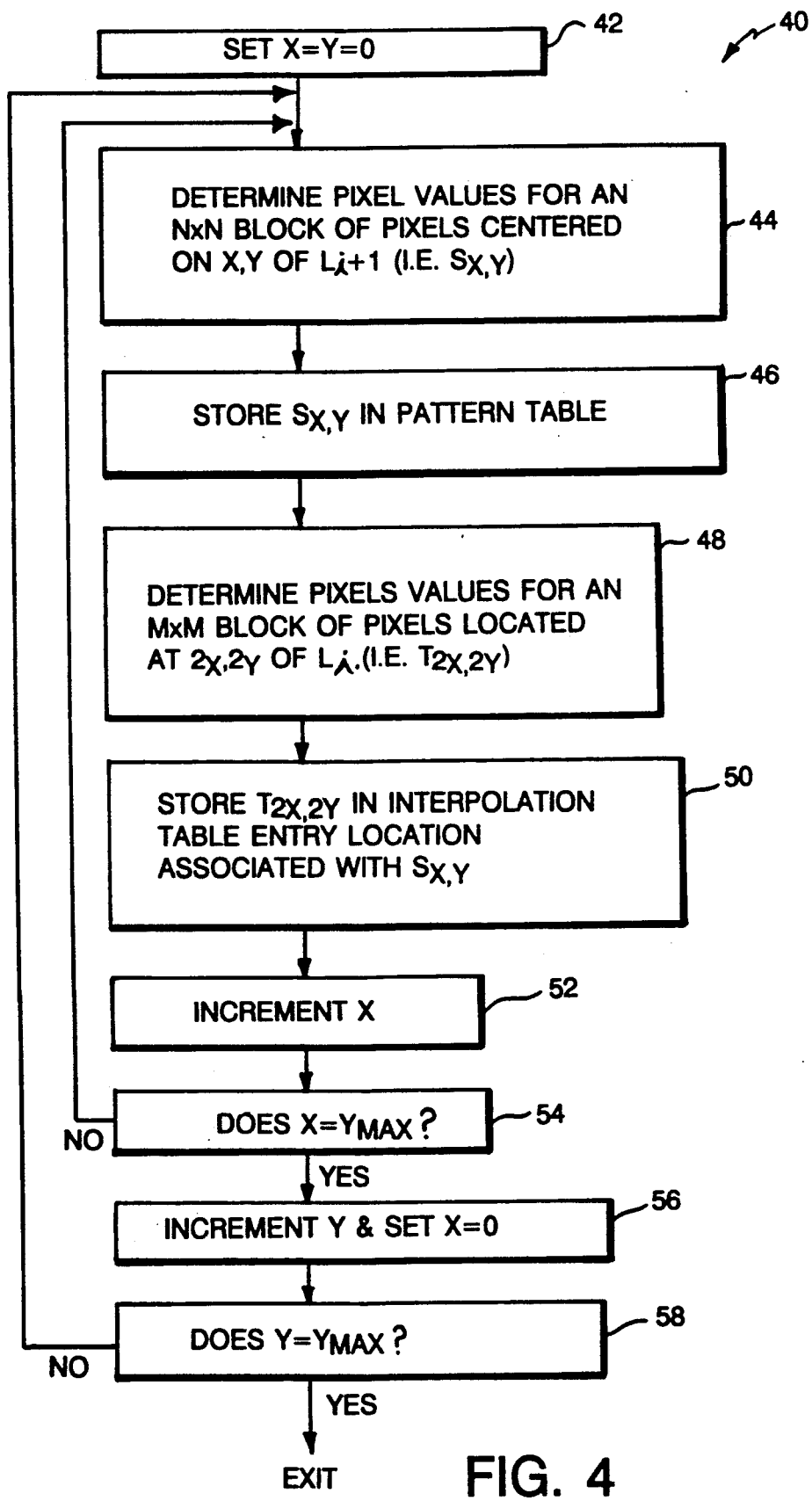
FIG. 4 depict an algorithm for generating the data structure shown in FIG. 3.

A table generating algorithm 40, such as is depicted in FIG. 4, generates data structure 30 from $L_i$ and $L_{i+1}$. At the start of algorithm 40, the pixel coordinates, x and y, are initialized to zero (step 42). Then, the pixel values for a 3×3 block of pixels that is centered on location 0,0 of Laplacian image $L_{i+1}$ is determined (step 44) and stored as a first entry in pattern table 32 (step 46). It is assumed that Laplacian image $L_{i+1}$ is $X_{max}$ pixels wide and $Y_{max}$ pixels high.

For purposes of determining the pixel patterns surrounding each pixel in that image, the pixels along the edge are extended beyond the edge of the image. Thus, the 3×3 array of pixels centered on location (0,5) would have the values of the pixels at the following locations:

```
(0, 4)  (0, 4)  (1, 4)
(0, 5)  (0, 5)  (1, 5)
(0, 6)  (0, 6)  (1, 6).
```

Of course, other known approaches for dealing with the pixels that lie along the edges of the image could also be employed. For example, rather than extending the edges of the image, it can be assuming that the image wraps around in both the x and y directions. Thus, the 3×3 array of pixels centered on location (0,5) are at the following positions:

```
($X_{max}$ − 1, 4)   (0, 4)   (1, 4)
($X_{max}$ − 1, 5)   (0, 5)   (1, 5)
($X_{max}$ − 1, 6)   (0, 6)   (1, 6).
```

After the pattern $S_{x,y}$ has been stored, algorithm 30 determines the pixel values for a corresponding 2×2 block of pixels in Laplacian image $L_i$, i.e., it determines $T_{2x,2y}$ (step 48). Since Laplacian image $L_i$ is twice as large as Laplacian image $L_{i+1}$, the 2×2 block of pixels corresponding to location (x,y) is located at position (2x,2y) of Laplacian image $L_i$ and contains the pixels at the following positions:

```
(2x, 2y)      (2x + 1, 2y)
(2x, 2y + 1)  (2x + 1, 2y + 1).
```

The pattern $T_{2x,2y}$ is then stored in interpolation table 34 at a location associated with $S_{x,y}$ (step 50).

Next, x is incremented (step 52) and then tested to determine whether it has gone beyond the end of the image (step 54). If x is not equal to $X_{max}$, algorithm 40 branches back to repeat steps 44, 46, 48, 50 and 52 for the next pixel location of Laplacian image $L_{i+1}$. When x reaches $X_{max}$, algorithm 40 increments y and initializes x (step 56). Then, y is tested to determine whether it has gone beyond the end of image in the y direction (step 58). If y does not equal $Y_{max}$, branches back to step 40 and repeats the following sequence of steps for all pixels for that row. When y reaches $Y_{max}$, data structure 30 is complete and algorithm 40 exits.

Figure 5A:
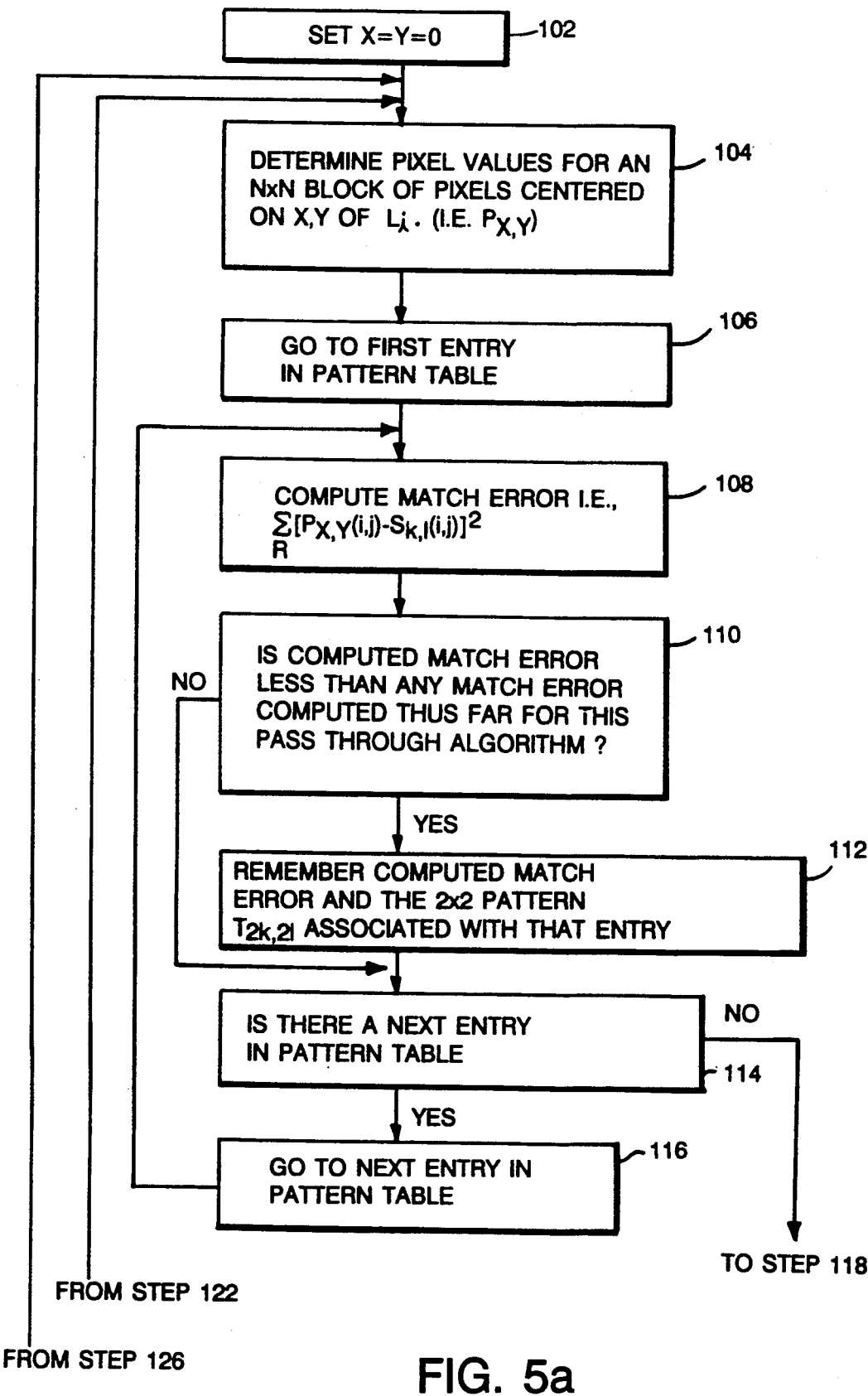
FIGS. 5a and 5b depict an algorithm for generating a lower level image of the Laplacian image pyramid from the data structure shown in FIG. 3.
Figure 5B:
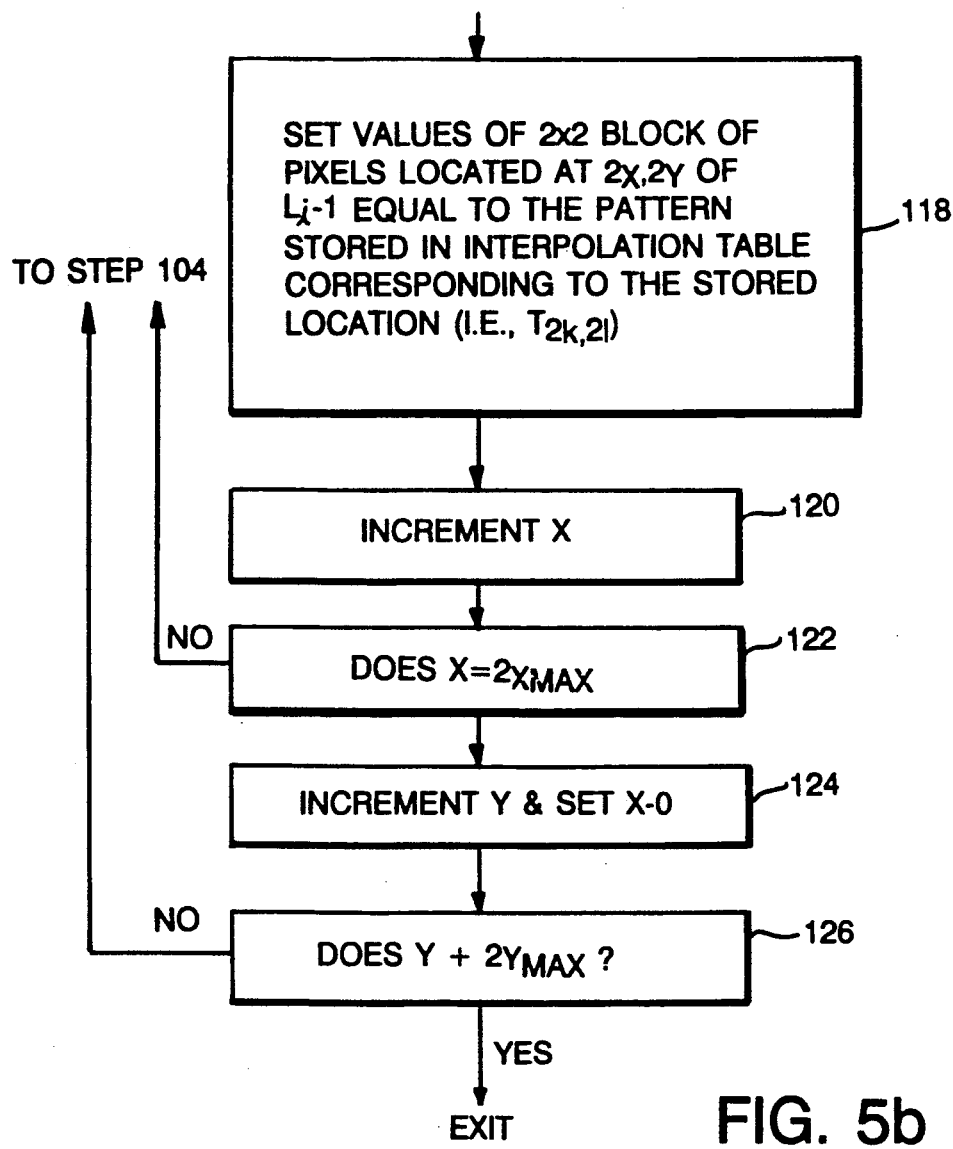

An interpolation algorithm 100, such as is depicted in FIGS. 5a and 5b, is then used to interpolate what the next octave of the subband image will look like, namely, Laplacian image $L_{i-1}$, based upon the information stored in data structure 30. The interpolation begins by setting coordinate index values x and y both to zero (step 102). Then, algorithm 100 determines what the pixel values are for a 3×3 block of pixels centered on the pixel located at (0,0) of Laplacian image $L_i$ (step 104). That is, algorithm 100 determines $P_{x,y}$, the image pattern in a region of the image around pixel coordinate (x,y) for the case where x=0 and y=0.

Then, algorithm 100 finds the entry in pattern table 32 of data structure 30 that most closely matches image pattern $P_{x,y}$. It begins the search by retrieving the first entry (step 106) and computing a match error for that entry (step 108). The match error is computed by subtracting the table entry from the pattern obtained from Laplacian image $L_i$, squaring each term and then summing the nine values to generate a scalar value. In particular:

Match Error = $\Sigma[P_{x,y}(i,j) - S_{k,l}(i,j)]^2$, where R is the group of pixels that make up the 3×3 block.

Next, the computed match error is compared to the smallest match error computed for Laplacian image $L_i$ thus far (step 110). If the computed match error is smaller than all previously computed match errors, its value is remembered along with the associated pattern stored in interpolation table 34, namely, $T_{2k,2l}$ (step 112). Then, algorithm 100 determines whether there are any more entries in pattern table 32 that have not be checked (step 114). If a previously computed match error is smaller than the current match error, algorithm 100 branches directly to step 114.

If there is a next entry, algorithm 100 retrieves that entry (step 116) and branches back to step 108 to determine whether it yields a better match than all previously checked entries.

This process is repeated for each entry in pattern table 32 until all patterns have been checked. At the conclusion of the search, algorithm 100 will have identified the entry in pattern table 32 that is the best match with the selected 3×3 pixel pattern of the $L_{i-1}$ image and will have stored the corresponding entry from interpolation table 34.

In step 114, when algorithm 100 determines that there are no more entries in pattern table 32, it branches to step 118 in which it sets the values of a 2×2 block of pixels located at (2x,2y) of $L_{i-1}$ equal to the stored pattern in interpolation table 34 corresponding to the 3×3 pixel pattern from pattern table 32 that best matches the 3×3 pattern from Laplacian image $L_i$. That is, the group of pixels in Laplacian image $L_{i-1}$ located at:

```
(2x, 2y)      (2x + 1, 2y)
(2x, 2y + 1)  (2x + 1, 2y + 1)
``` are set equal to $T_{2k,2l}$.

After the 2×2 pixel pattern at location (2x,2y) has been established, algorithm 100 increments x (step 120) and then checks if x has gone beyond the end of the image (step 122). If x does not equal $2X_{max}$, algorithm 100 branches back to step 104 and repeats the above-described sequence of steps to determine the pixel values for the next 2×2 block of pixels in the Laplacian image $L_{i-1}$. On the other hand, if x equals $2X_{max}$, algorithm 100 increments y and sets x to zero (step 124). The new value of y is then checked to determine whether it is outside the image (step 126). If y does not equal $2Y_{max}$, algorithm 100 branches back to step 104 and repeats the above-described sequence of steps to determine the pixel values for the first 2×2 block of pixels on the next row of the Laplacian image $L_{i-1}$. When y reaches $2Y_{max}$, indicating that the last line of the image has been determined, algorithm 100 indicates that the Laplacian image $L_{i-1}$ is complete.

Figure 6:
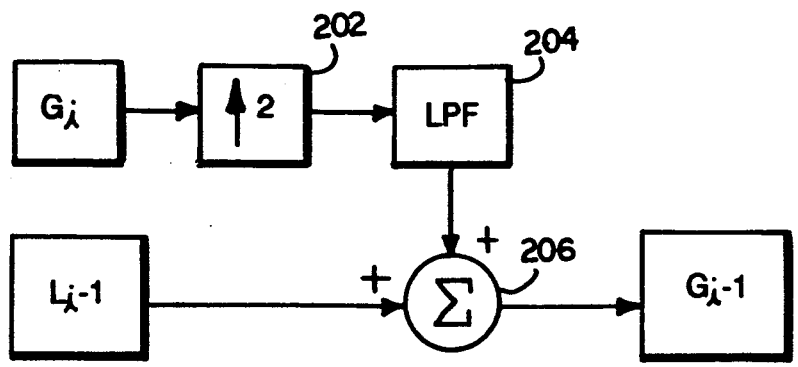
FIG. 6 is a block diagram of a circuit for generating a Gaussian image $G_{i-1}$ from the Gaussian image $G_i$ and the Laplacian image $L_{i-1}$.

Using the circuit shown in FIG. 6, the resulting Laplacian image $L_{i-1}$ is then combined with Gaussian image $G_i$ to generate a higher resolution Gaussian image $G_{i-1}$. First, an upsampler 202 upsamples Gaussian image $G_i$ to generate an expanded image that has four times as many pixels and in which the added pixels all have zero values. Upsampler 202 performs the same function as does the previously described upsampler 8 shown in FIG. 1. Next, the expanded image is passed through a low-pass filter (LPF) 204 to generate an interpolated image. LPF 204 employs the same gaussian-like weighting function as is used in LPF 4 and LPF 10 shown in FIG. 1. An adder 206 then combines the interpolated image with the Laplacian image $L_{i-1}$ to generate the Gaussian image $G_{i-1}$.

The above-described process can be recursively applied to the original image to generate a sequence of Gaussian images each having higher resolution than the preceding one. To generate each successively lower level of the Gaussian image pyramid, the same data structure 30 that was generated from the original image may be used. In other words, data structure 30 is used to generate Laplacian image $L_{i-2}$ from Laplacian image $L_{i-1}$, to generate Laplacian image $L_{i-3}$ from Laplacian image $L_{i-2}$, etc. Then, the circuit shown in FIG. 6 is recursively applied to the sequence of Laplacian images to generate a Gaussian image having the resolution corresponding to the highest frequency subband image.

Figure 7A:
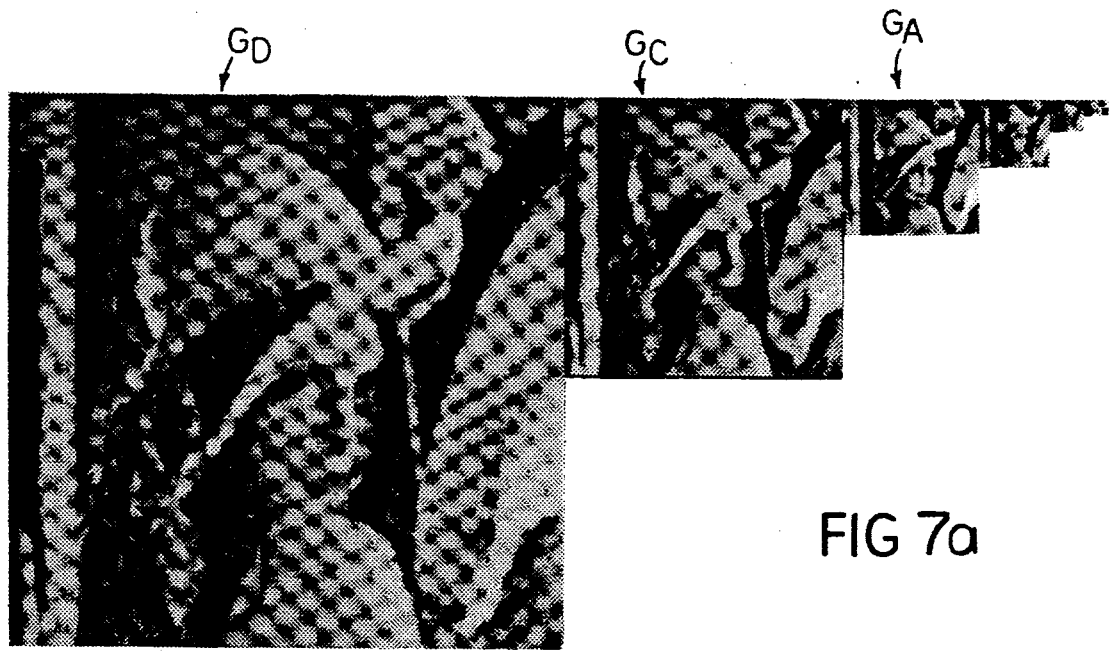
FIGS. 7a and 7b are examples of a Gaussian image pyramid and a Laplacian image pyramid each having higher resolution image levels that are derived from a lower resolution original image.
Figure 7B:
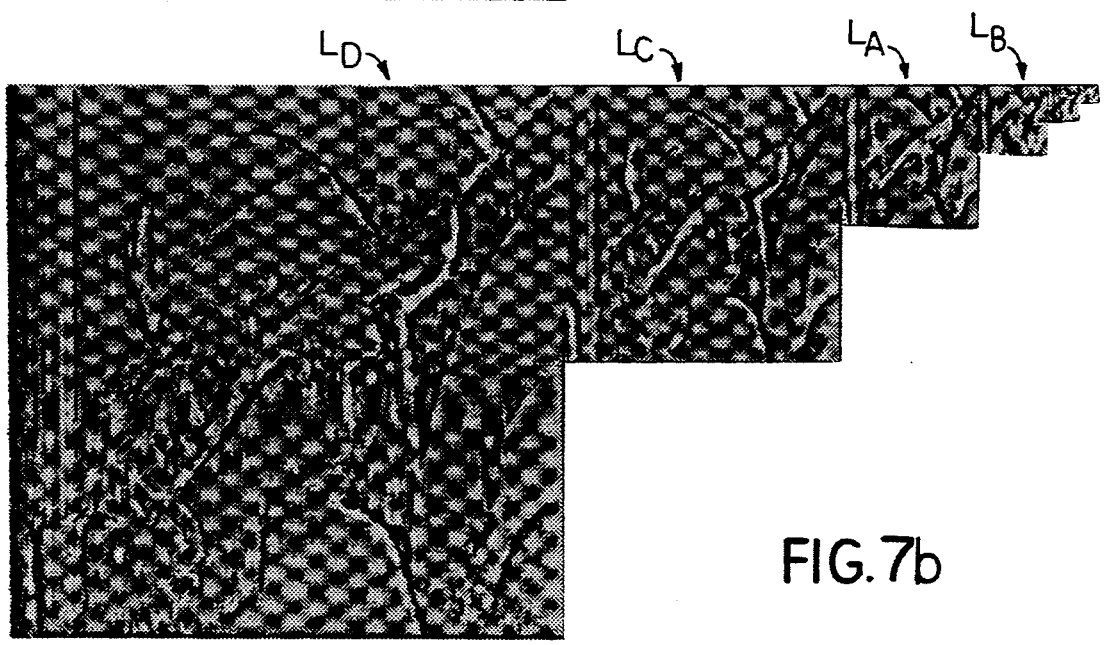
Figure 7C:
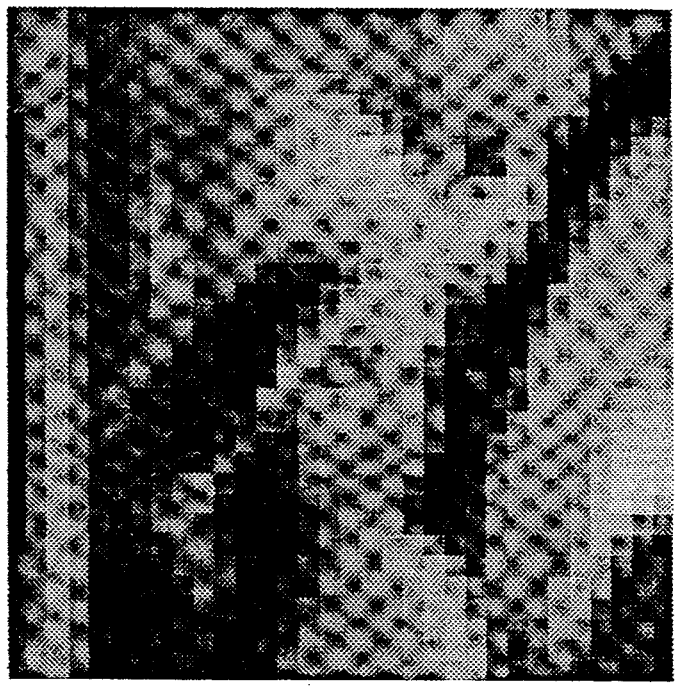
FIG. 7c is an upsampled version of the original image from which higher resolution image levels in FIGS. 7a and 7b were derived.

FIGS. 7a-c illustrated the effectiveness of the described technique in generating higher resolution images from an original image. Gaussian image $G_A$ represents the original image. From Gaussian image $G_A$, Laplacian images $L_A$ and $L_B$ were generated by recursively applying circuit 2 shown in FIG. 1. Then, a data structure was generated which specified how $N \times N$ pixel patterns from $L_B$ transform into corresponding $M \times M$ pixel patterns in $L_A$. The data structure was in turn used to generate $L_C$ from $L_A$ and to generate $L_D$ from $L_C$. Finally, the circuit shown in FIG. 6 was recursively applied to $G_A$, $L_C$ and $L_D$ to produce $G_C$ and then $G_D$, an image with approximately 16 times the resolution of the original image $G_A$. As an indication of the gain in resolution, FIG. 7c illustrates what the original image $G_A$ looks like if upsampled to equal the size of the final image $G_D$.

Other embodiments are within the following claims. For example, other filters besides Gaussian filters may be used to generate the band pass representation. Such alternative filters include, but are not limited to, quadrature mirror filters. In addition, vector quantization techniques can be employed to reduce the size of the tables and the computational burden associated with the search for the table pattern that most closely matches the image pattern. Furthermore, the rule specifying how pixel patterns associated with one subband image transform into pixel patterns associated with another subband image can be represented in a form other than the linked table structure described above. For example, an associative neural network, such as a Hopfield network, can be used to express the transformation rule. Or the rule can be characterized by a set of polynomials whose coefficients are selected on the basis of the rule being represented. Using polynomials to characterize the rule eliminates the need for a search phase and thus is likely to significantly improve the efficiency with which results are derived.

Although the described embodiment predicted higher resolution subband data from information present in the original image, the invention may also be used to predict subband data for other subbands of the original image. For example, as is sometimes the case, the transmission channel may corrupt the data in only one of the lower level subbands of the image. In that case, the invention can be used to "repair" that corrupted subband data to restore the original image.

Also, it should be understood that the rule (i.e., data structure 30) can be derived from a segment of the relevant band-pass image (i.e., in this case, Laplacian image $L_{i+1}$) rather than from the entire band-pass image. Or it can be derived from an image representation of an entirely different original image. Furthermore, the search of data structure 30 can be limited to a region surrounding the location corresponding to the selected pattern.

In addition, to improve efficiency while not seriously diminishing the benefit, the invention can be applied to selected segments of the image being enhanced or restored rather than to the entire image. For example, since most of an image consists of regions that have no image detail (i.e., the have uniform intensity), the image data in those regions is either zero or near zero. Applying the transformation to those regions of the image is not likely to produce significant improvement in the image. To improve efficiency the transformation rule is not applied to such areas but rather is applied to those areas which contain either zero crossings or peaks in the subband image signal (i.e., image regions where the "action" is).

What is claimed is:

1. An image interpolator for converting an original image into an enhanced image, the interpolator comprising:
    rule logic for embodying a rule specifying how pixel patterns associated with first subband immage data transform into corresponding pixel patterns associated with second subband image data, said first and second subband image data being spatial frequency subband image data derived from a reference image that is generated by a single sensor; and
    conversion logic for generating the enhanced image from the original image based upon said rule, wherein said conversion logic comprises:
    means for generating high resolution subband image data from the second subband image data in accordance with said rule; and
    means for combining the original image with the high resolution image data to generate the enhanced image.

2. The image interpolator of claim 1 wherein said reference image is derived from the original image.

3. The image interpolator of claim 2 wherein said reference image is the original image or a subset of the original image.

4. The image interpolator of claim 3 wherein the original image is decomposable into a pyramid of bandpass images and said first and second subband image data correspond to different images of said pyramid.

5. The image interpolator of claim 4 wherein said first and second subband image data correspond to neighboring images of said pyramid.

6. The image interpolator of claim 5 wherein successive images of said pyramid of bandpass images are scaled versions of the immediately preceding image from which it was derived.

7. The image interpolator of claim 6 wherein a scaling factor of R relates neighboring levels of the image pyramid, R being a positive integer.

8. The image interpolator of claim 7 wherein R is equal to 2.

9. The image interpolator of claim 2 wherein said first and second subband image data correspond to neighboring subbands of the reference image.

10. The image interpolator of claim 1 wherein said second subband image data represents higher spatial frequencies than said first subband image data.

11. The image interpolator of claim 1 wherein said high resolution subband image data has a spatial frequency resolution that is higher than the spatial frequency resolution of the original image.

12. The image interpolator of claim 1 wherein said rule logic further comprises:
a filter for generating said first and second subband image data from the original image; and
means for deriving said rule from said first and second subband image data.

13. The image interpolator of claim 12 wherein said first and second subband image data are derived from the original image, said first and second subband image data corresponding respectively to a first and a second subband image; and said rule deriving means comprises table generating logic for generating a table relating each of a plurality of N×N pixel patterns from said first subband image to a corresponding M×M pixel pattern of said second subband image.

14. The image interpolator of claim 13 wherein said conversion logic comprises:
means for generating high resolution subband image data from the second subband image data in accordance with said rule, said high resolution subband image data having a spatial frequency resolution that is higher than the spatial frequency resolution of the original image; and
means for combining the original image with the high resolution image data to generate the enhanced image.

15. The image interpolator of claim 13 wherein said conversion logic comprises:
selection logic for selecting an N×N pixel pattern of the second subband image;
search logic for finding an N×N pixel pattern in the table which best matches the selected N×N pixel pattern; and
assignment logic for assigning to corresponding locations within the high resolution subband image data an M×M pixel pattern from the table that is associated with the identified N×N pixel pattern.

16. The image interpolator of claim 12 wherein said first and second subband image data are derived from the original image, said first and second subband image data corresponding respectively to a first and a second subband image; and said rule deriving means comprises neural network generating logic for generating an associative neural network relating each of a plurality of N×N pixel patterns from said first subband image to a corresponding M×M pixel pattern of said second subband image.

17. The image interpolator of claim 12 wherein said first and second subband image data are derived from the original image, said first and second subband image data corresponding respectively to a first and a second subband image; and said rule deriving means comprises coefficient generating logic for generating coefficients for a set of equations relating each of a plurality of N×N pixel patterns from said first subband image to a corresponding M×M pixel pattern of said second subband image.

18. The image interpolator of claim 12 wherein said filter employs a Gaussian-like filter to generate said first and second subband image data.

19. The image interpolator of claim 12 wherein said filter employs a quadrature mirror filter to generate said first and second subband image data.

20. A method for converting an original image into an enhanced image, the method comprising:
determining a rule according to which pixel patterns associated with first subband image data are transformed into corresponding pixel patterns associated with second subband image data, said first and second subband image data being spatial frequency subband image data derived from a reference image that is generated by a single sensor; and
generating the enhanced image from the original image based upon said rule, wherein said step of generating the enhanced image comprises:
generating high resolution subband image data from the second subband image data in accordance with said rule; and
combining the original image with the high resolution image data to generate the enhanced image.

21. The method of claim 20 wherein said reference image is derived from the original image.

22. The method of claim 21 wherein said reference image is the original image or a subset of the original image.

23. The image interpolator of claim 22 wherein the original image is decomposable into a pyramid of bandpass images and said first and second subband image data correspond to different images of said pyramid.

24. The image interpolator of claim 23 wherein said first and second subband image data correspond to neighboring images of said pyramid.

25. The image interpolator of claim 24 wherein successive images of said pyramid of bandpass images are scaled versions of the immediately preceding image from which it was derived.

26. The image interpolator of claim 25 wherein a scaling factor or R relates neighboring levels of the image pyramid, R being a positive integer.

27. The image interpolator of claim 26 wherein R is equal to 2.

28. The image interpolator of claim 21 wherein said first and second subband image data correspond to neighboring subbands of the reference image.

29. The method of claim 20 wherein said second subband image data represents higher spatial frequencies than said first subband image data.

30. The method of claim 20 wherein said high resolution subband image data has a spatial frequency resolution that is higher than the spatial frequency resolution of the original image.

31. The method of claim 20 wherein said rule determining step further comprises:
filtering said original image to generate said first and second subband image data; and
deriving said rule from said first and second subband image data.

32. The method of claim 31 wherein said first and second subband image data correspond respectively to a first and a second subband image; and said rule deriving step comprises generating a table relating each of a plurality of N×N pixel patterns from said first subband image to a corresponding M×M pixel pattern of said second subband image.

33. The method of claim 32 wherein said enhanced image generating step comprises:
generating high resolution subband image data from the second subband image data in accordance with said rule, said high resolution subband image data having a spatial frequency resolution that is higher than the spatial frequency resolution of the original image; and
combining the original image with the high resolution image data to generate the enhanced image.

34. The method of claim 32 wherein said enhanced image generating step comprises:
selecting an N×N pixel pattern of the second subband image; finding an N×N pixel pattern in the table which best matches the selected N×N pixel pattern; and
assigning to corresponding locations within the high resolution subband image data an M×M pixel pattern from the table that is associated with the identified N×N pixel pattern.

35. The method of claim 31 wherein said filtering step employs a Gaussian-like filter to generate said first and second subband image data.

36. The method of claim 31 wherein said filtering step employs a quadrature mirror filter to generate said first and second subband image data.

* * * * *

UNITED STATES PATENT AND TRADEMARK OFFICE
CERTIFICATE OF CORRECTION

PATENT NO. : 5,148,497

DATED : September 15, 1992

INVENTOR(S) : Alex P. Pentland, Eero P. Simoncelli, Thomas P. Stephenson

It is certified that error appears in the above-identified patent and that said Letters Patent is hereby corrected as shown below:

Col. 6, line 8; "Match Error = $\Sigma$" should be --Match Error = $\frac{\Sigma}{R}$--.

Signed and Sealed this

Ninth Day of November, 1993

Attest:

BRUCE LEHMAN

Attesting Officer     Commissioner of Patents and Trademarks